US012182870B2

(12) United States Patent
Eller et al.

(10) Patent No.: US 12,182,870 B2
(45) Date of Patent: Dec. 31, 2024

(54) REMEDIATION SITE PORTFOLIO RISK SCORING

(71) Applicant: GHD, INC., Phoenix, AZ (US)

(72) Inventors: Jonathan Eller, Midland, MI (US); Jayesh Srivastava, Edison, NJ (US); Brian Peters, Lynnwood, WA (US); Brett Roberts, Highlands Ranch, CO (US); Roy Thun, Valencia, CA (US); Matt Rousseau, Windsor (CA)

(73) Assignee: GHD, INC., Phoenix, AZ (US)

( * ) Notice: Subject to any disclaimer, the term of this patent is extended or adjusted under 35 U.S.C. 154(b) by 190 days.

(21) Appl. No.: 17/864,240

(22) Filed: Jul. 13, 2022

(65) Prior Publication Data

US 2023/0013320 A1    Jan. 19, 2023

Related U.S. Application Data

(60) Provisional application No. 63/222,294, filed on Jul. 15, 2021.

(51) Int. Cl.
   *G06Q 40/06*  (2012.01)
   *G06N 5/022*  (2023.01)

(52) U.S. Cl.
   CPC ............. *G06Q 40/06* (2013.01); *G06N 5/022* (2013.01)

(58) Field of Classification Search
   CPC .............................. G06Q 40/06; G06N 5/022
   See application file for complete search history.

(56) References Cited

U.S. PATENT DOCUMENTS

| 6,782,321 B1 * | 8/2004 | Burton ................... G01V 11/00 703/10 |
| 7,031,838 B1 * | 4/2006 | Young ..................... G06Q 50/00 702/5 |

(Continued)

OTHER PUBLICATIONS

Efroymson, "A Framework for Net Environmental Benefit Analysis for Remediation or Restoration of Contaminated Sites," 2004 (Year: 2004).*

(Continued)

*Primary Examiner* — Matthew S Gart
*Assistant Examiner* — William D Newlon
(74) *Attorney, Agent, or Firm* — SNELL & WILMER L.L.P.

(57) ABSTRACT

The system may project and prioritize remediation timelines and costs, such that owners may prioritize spend across a portfolio of contaminated properties to maximize the overall effect of contamination remediation efforts, and to increase the likelihood of regulatory acceptance of proposed remediation strategies. The system may include a method for developing, an extreme event risk score based on operational environment data, legislative environment data and a data environment; determining a remediation score based on harm reduction data, cost data, sustainability data, resiliency data, the extreme event risk score and the data environment; determining a remediated risk score based on an initial risk score and the remediation score; determining a risk rating pre-remediation based on the initial risk score and an information depth score; and determining the risk rating post-remediation based on the remediated risk score and the information depth score.

19 Claims, 11 Drawing Sheets

(56) References Cited

U.S. PATENT DOCUMENTS

| | | | | |
|---|---|---|---|---|
| 2007/0088507 A1* | 4/2007 | Haberlen | ............... | G06Q 99/00 |
| | | | | 702/19 |
| 2008/0208637 A1* | 8/2008 | McKay | ................. | G06Q 40/08 |
| | | | | 705/4 |
| 2010/0030475 A1* | 2/2010 | Sohl, III | .............. | G01N 1/4005 |
| | | | | 702/2 |
| 2011/0004544 A1* | 1/2011 | Baum | .................... | G06Q 40/03 |
| | | | | 705/38 |
| 2021/0109497 A1* | 4/2021 | Man | ....................... | G06V 10/82 |
| 2024/0005423 A1* | 1/2024 | Darden | .................. | G06F 16/29 |

OTHER PUBLICATIONS

Lemming, "Risk-based economic decision analysis of remediation options at PCE-contaminated site," 2010 (Year: 2010).*

Rosen, "SCORE: A novel multi-criteria decision analysis approach to assessing the sustainability of contaminated land remediation," 2015 (Year: 2015).*

Joshi, "A Semantically Rich Framework for Knowledge Representation of Code of Federal Regulations," (Year: 2020).*

* cited by examiner

Scenarios:

- (e1,) : [(d1, no)]
  - Probability = 0.2
- (e2,) : [(d1, yes), (d2, no)]
  - Probability = 0.8*0.2 = 0.16
- (e3, e4, e7, e8) : [(d1, yes), (d2, yes), (d4, no), (d3, yes)]
  - Probability = 0.8*0.8*0.3*0.9 = 0.1728
- (e3, e5, e7, e8) : [(d1, yes), (d2, yes), (d4, yes), (d3, yes)]
  - Probability = 0.8*0.8*0.7*0.9 = 0.4032
- (e3, e4, e6) : [(d1, yes), (d2, yes), (d4, no), (d3, no)]
  - Probability = 0.8*0.8*0.3*0.1 = 0.0192
- (e3, e5, e6) : [(d1, yes), (d2, yes), (d4, yes), (d3, no)]
  - Probability = 0.8*0.8*0.7*0.1 = 0.0448

Simulated Data

| d1 | d2 | d3 | d4 | Risk |
|---|---|---|---|---|
| Yes | Yes | Yes | No | 3 |
| Yes | Yes | No | Yes | 5 |
| ... | ... | ... | ... | ... |

Figure 2A

| Probability of Extreme Event | Extreme Event Risk Score |
|---|---|
| 0 to 10% | 1 |
| >10 to 25% | 2 |
| >25 to 50% | 3 |
| >50 to 80% | 4 |
| >80 to 100% | 5 |

Figure 5

| Information Depth | | | |
|---|---|---|---|
| | Low | Medium | High |
| Site | Location and dates of site opening/closure are known. Little other information exists | In addition to "Low," also includes detailed chemistry information from various sampling events, in EDD format. Dates of progression through various regulatory stages; some documents exist; regulatory jurisdiction is listed. The completeness of all data is unknown. | In addition to "Medium," also includes records of correspondence between the regulator and responsible party; contextual details regarding how potential release(s) occurred. For all this, there is high confidence in completeness of information |
| Surroundings | There is little information about the property neighbors, physical setting or climate | There is considerable data available to characterize the physical setting of the site, such as climate, soil type, and land use. Geospatial data exists on the presence/location of specific types of sensitive receptors with respect to the site; minimally these must include wetlands, drinking water wells, and certain types of indoor gathering locations. The completeness of all data is unknown. | In addition to "Medium", rigorous detailed information on the site-specific lithology and hydrogeology is available. Prevailing groundwater flow is known with temporal frequency greater than one year. For all this, there is high confidence in completeness of the information |
| Setting | Census information is available the census in which the site is located, with minimum resolution of county. | In addition to environmental justice factors are known about the census geography of each site, such as pollution indicators and risk of exposure by residents; The completeness of all data is unknown | In addition to "Medium", all regulatory jurisdictions within the study area have been classified according to a metric that describes the efficiency at which projects are progressed. There is high confidence in completeness of the information |

Figure 7

| Information depth category | Description |
|---|---|
| AA | Information depth for Site is High<br>Information depth from either Surrounding or Setting is High<br>Information depth is at least Medium for all |
| AB | Information depth for Site is High or Medium<br>One Information depth of Low can exist only if the other two are High |
| BB | Information depth for Site is High or Medium<br>Information depth for other two can be Low if Site is High |
| BC | Information depth for Site is Medium or Low<br>Information depth for other two can be Low if Site is High |
| CC | Information depth for Site is Low<br>No Information depth is High<br>Maximum one Information Depth is Medium |
| OT | Basic understanding for site is unavailable<br>(e.g., open/close dates, no site location data, no understanding of surroundings.) |

Figure 8

REMEDIATION SITE PORTFOLIO RISK SCORING

CROSS-REFERENCE TO RELATED APPLICATIONS

This disclosure claims priority to, and the benefits of, U.S. Ser. No. 63/222,294 filed on Jul. 15, 2021 and entitled "Remediation Site Portfolio Risk Management," which is hereby incorporated by reference in its entirety for all purposes.

TECHNICAL FIELD

This disclosure generally relates to projecting and prioritizing remediation timelines and costs.

BACKGROUND

Organizations in every business sector are often held responsible for managing and/or paying for the environmental remediation of contaminant releases associated with past or present business practices. Example releases include leaking underground fuel tanks, pipeline releases and/or chemical spills. In many cases, organizations designated as responsible parties are directed to remediate or restore such contaminated lands or properties (sites) to conditions that are protective of human health and the environment. The process of remediating sites can be decades long and is generally regulated by federal/regional or state authorities under a variety of applicable, relevant and appropriate requirements.

With respect to managing a portfolio of contaminated sites, responsible parties tend to focus on reducing risk and minimizing overall liability with the ultimate goal of receiving regulatory confirmation of site closure often in the form of a no further action (NFA) notice. Strategies to reach the end goal may vary across a portfolio and between organizations. Organizations typically have a limited annual budget for portfolio management, which is often used to achieve the greatest liability reduction.

Current processes for managing sites or portfolios are generally human-dependent. The processes often rely on the experience of a small number of experienced professionals, often with less emphasis placed on a data-driven comparison of current sites to previously existing sites. In that regard, there is no generally agreed-upon process to determine the longevity and cost to closure of a site or portfolio. For this and other reasons, typical timelines to achieve remediated site closure can span decades.

Remediation may be very expensive and take decades to complete. Moreover, the remediation of most sites involves risk. The contributors to the risk may include, for example, remedy selection, path to closure, intended future site use, cost forecasts, schedule forecasts and/or sustainability/resilience. Furthermore, not all information used to initially estimate the risk may be initially available. For example, one of the biggest uncertainties, and one of the most important aspects of estimating risk, is a full and comprehensive site characterization. Site characterization data may enable the accuracy of many risk elements to improve as time goes on and more is known. However, many organizations may desire to more accurately estimate the risk earlier in the process, while collecting less data.

SUMMARY

The system includes a method to address the need for early and accurate business risk determination, given certain baseline data availability. Once the risk is known, the risk may be used to prioritize sites for investment, predict likely outcomes, and/or allow responsible parties to make highly informed decisions about how to optimize activities across a portfolio. These decisions, in turn, can lead to minimizing the time and cost often required to reach regulatory closure.

In various embodiments, the system may provide a data-driven and probabilistic framework which allows owners, interested parties, and responsible parties of contaminated properties to estimate the risk of such contaminated properties (or sites) in a portfolio. The system may allow users to, for example, obtain a more accurate projection of final remediation ("closure") costs and timelines, prioritize spend across a portfolio of contaminated properties to maximize the overall effect of contamination remediation efforts, and increase the likelihood of regulatory acceptance of proposed remediation strategies.

In various embodiments, the output from the system may include a classification of sites to determine the sites' overall risk and opportunity to achieving closure in a given time frame. The system may also prescribe alternative approaches to achieve closure or suggest adjusting the approaches that are currently being used.

In various embodiments, the system may allow for a re-forecasting of the provision by site, based on the proposed alternative methods, and suggested optimization of spending across the sites to get the best return (e.g., highest reduction in provision) for the money spent across the sites. For example, site A may be currently in a long-term monitoring phase and showing little change in contaminant concentration trends. Therefore, site A is highly unlikely to achieve closure in the near term. As such, the system may determine that targeted chemical injections may be effective at the site to expedite the remediation process. Based on any part of the analysis set forth herein, the system may also send a signal to an injection system to initiate and/or continue the targeted injections for a certain time period. The injections may result in an increased cost in the near-term, but the injections may result in a faster reduction in concentrations to expedite the remediation process. The faster reduction in concentrations may result in a higher opportunity for closure, and a reduction in the long-term provision for the site. Additionally, in various embodiments, based on any part of the analysis set forth herein, the system may send a request to adjust the field sampling event scheduling and/or send a signal to trigger the mobilization of field technicians to higher priority sites for sample collection. In various embodiments, based on any part of the analysis set forth herein, the system may activate telemetric devices (e.g., sensors) at high-risk sites, the system may deactivate telemetric devices at low priority sites, and/or the system may set the telemetric devices to a low-energy mode that collects less frequent data. In various embodiments, based on any part of the analysis set forth herein, the system may deploy drones to collect imagery. The drones may be equipped with visible and/or non-visible light cameras optimized for thermal imaging to search for evidence of thermal contaminant destruction or other site condition changes. The drones may be equipped with telemetric devices enabling detection of hydrocarbon releases. In various embodiments, the system may also enable owners to identify the easiest or least expensive actions to move toward achieving closure of the sites. In that regard, the system may also recommend a prioritized list of sites for "investment" to achieve closure and to reduce an owner's long-term provision across the portfolio of sites.

In general, in various embodiments, the system may include a method for developing, by a processor, an extreme event risk score based on operational environment data, legislative environment data and a data environment; determining, by the processor, a remediation score based on harm reduction data, cost data, sustainability data, resiliency data, the extreme event risk score and the data environment; determining, by the processor, a remediated risk score based on an initial risk score and the remediation score; determining, by the processor, a risk rating pre-remediation based on the initial risk score and an information depth score; and determining, by the processor, the risk rating post-remediation based on the remediated risk score and the information depth score.

The method may further comprise developing a decision tree based on the legislative environment for a period of time. The method may further comprise re-training a predictive model to improve the accuracy of the extreme event risk score. The method may further comprise data mining documents within the data environment to obtain risk indicators.

The data environment may comprise a site compartment, a surroundings compartment and a setting compartment. The data environment may comprise at least one of databases, a data lake, APIs to third party data sources or telemetric technologies. The data environment may comprise a data lake that includes geospatial data, tabular data and documents. A remediated risk value $R_M$ may be calculated by the product of the initial risk score and a remediation score for any time point. A total expectation of a risk may be calculated by taking the integral of a remediated risk $R_M$ over a change in time. The portfolio priorities may be based on the operational environment data and the legislative environment data. The portfolio constraints may encode the portfolio priorities. The operational environment data may be based on at least one of a number of sites or portfolios an organization may maintain, a similarity of the sites controlled by the organization, regulatory stages of the sites, the kind of data that is currently captured, whether the data is captured digitally, a structure of the data or data architecture currently in place, and/or the extreme event(s) whose risk should be modeled. The method may further comprise attenuating the risk score based on at least one of an enforcement environment or regulatory resource restraints. The extreme event risk score may be based on a probabilistic rating that reflects how likely a site is to encounter the chosen event, such as taking an abnormally long time to close relative to other sites.

The method may further comprise normalizing, by the processor, the remediation score for a site to other sites. The method may further comprise weighting, by the processor, at least one of the harm reduction data, the cost data or the sustainability data. The harm reduction data may comprise an ability of a remedial option to destroy or immobilize contamination, rendering the contamination less harmful to human health or the environment. The cost data may comprise a financial requirement to design and enact a remedial option. The sustainability data may comprise an environmental footprint of the remedial option.

BRIEF DESCRIPTION OF THE DRAWINGS

The accompanying drawings, wherein like numerals depict like elements, illustrate exemplary embodiments of the present disclosure, and together with the description, serve to explain the principles of the disclosure. In the drawings:

FIGS. 2A and 2B show an exemplary portion of a decision tree showing a visual indication of the decision nodes, example questions, leaf node outcomes, outcome descriptions and decision paths to traverse the nodes, in accordance with various embodiments.

FIG. 5 shows an exemplary chart for determining an extreme event risk score, in accordance with various embodiments.

FIG. 7 shows an exemplary chart for classifying the information depth, in accordance with various embodiments.

FIG. 8 shows an exemplary chart for determining the overall information depth category for a site, in accordance with various embodiments.

DETAILED DESCRIPTION

The system may include a framework that produces a risk rating 180 for one or more contaminated sites, or a portfolio of sites. This risk rating 180 may be reflective of the probability of the occurrence of an extreme event, e.g., taking an abnormally long time to close. The risk rating 180 may also be reflective of the quality of data available for each site (that forms the information depth scoring 165). The risk rating 180 may be used for single sites, but the risk rating 180 may have additional value when applied to a portfolio of sites. In various embodiments, the system may be implemented using one or more of software, hardware, a website, a platform, SaaS, PaaS, an app, a micro-app, a server, a distributed network, big data, blockchain, the cloud, a database and/or other technology.

Figure 1:
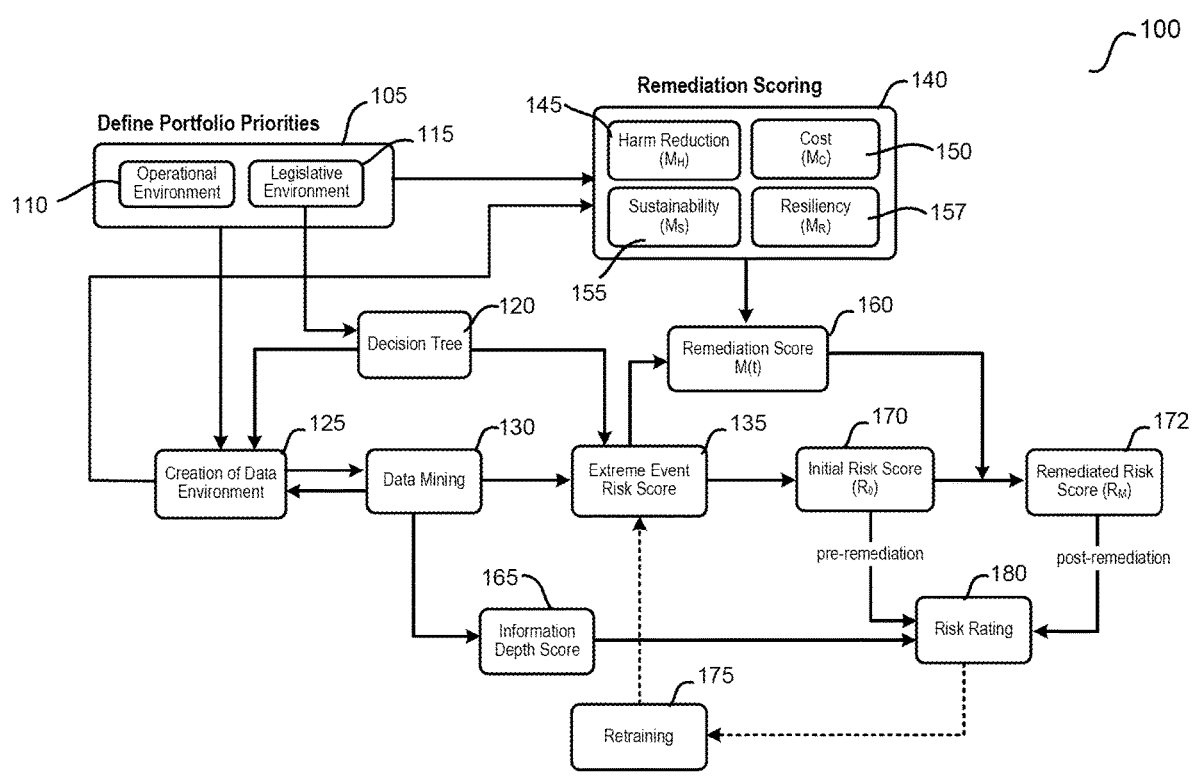
FIG. 1 shows an exemplary flow diagram of the components and process for the overall risk process, in accordance with various embodiments.

As an overview, and as set forth in FIG. 1, the system may perform an overall risk process 100 to determine a risk rating 180. In various embodiments, the system may define portfolio priorities 105. The defining of portfolio priorities 105 may include an analysis of data about the operational environment 110 and/or the legislative environment 115. The system may include a decision tree 120 that uses the data about the legislative environment 115. The decision tree 120 may provide output to help create the data environment 125 and/or to help determine the extreme event risk score 135. The system may create a data environment 125 based on the portfolio priorities 105, input from the decision tree 120 and/or other data from data mining 130. The data environment 125 may provide output to help with remediation scoring process 140 and/or data mining 130. The data mining 130 may provide output for information depth scoring 165 and/or the extreme event risk score 135. The remediation scoring 140 may be based on input from portfolio priorities 105, the data environment 125 and data about harm reduction $M_H$ 145, cost $M_C$ 150, sustainability $M_S$ 155 and/or resiliency $M_R$ 157. The remediation scoring process 140 and the extreme event risk score 135 may be used to create a remediation score M(t) 160. The extreme event risk score 135 may be used to create the initial risk score ($R_0$) 170. The remediation score M(t) 160 and the initial risk score ($R_0$) 170 may be used to determine the remediated risk score $R_M$ 172. For pre-remediation, the system may create the risk rating 180 based on the information depth score 165 and the initial risk score ($R_0$) 170. For post-remediation, the system may create the risk rating 180 based on the information depth score 165 and the remediated risk score $R_M$. As part of a feedback loop, the system may perform re-training 175 on the risk rating 180 and provide the results to the extreme event risk score 135.

Figure 2B:
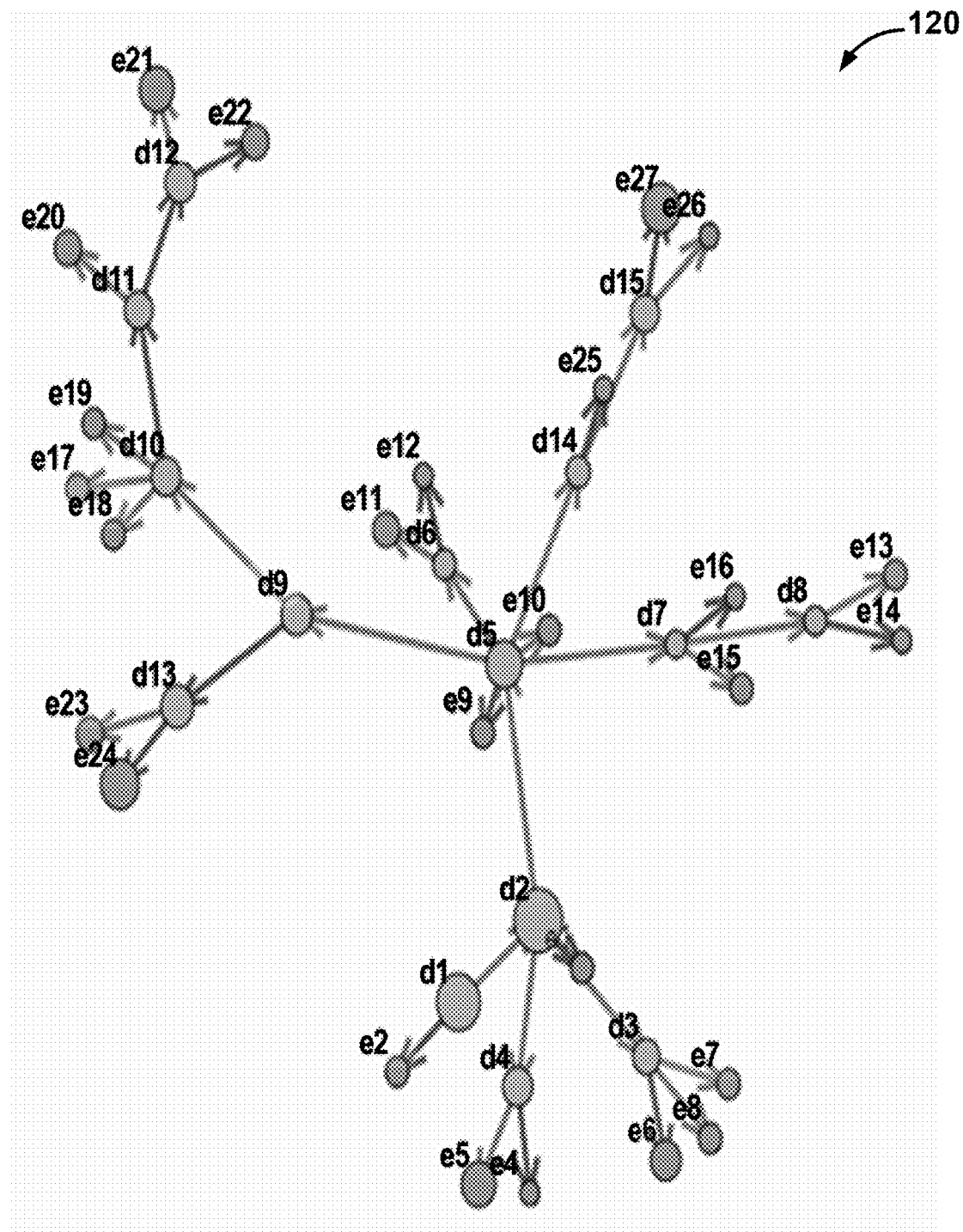

In various embodiments, the system may perform re-training 175 of the predictive model used for the risk rating 180 and improve prediction accuracies for future sites or portfolios. For example, this re-training 175 may enable the accuracy of the initial risk score (R0) 170 and/or the risk rating 180 to improve. The re-training 175 may be part of a feedback loop that provides improved data to the extreme event risk score 135. The system may use new data to perform the re-training. The new data may be obtained from new sites and the new data may augment the existing dataset used to calculate the probabilities underlying the risk calculations. The new data may be used to compute a training objective and the system may update the predictive model based on the training objective. The machine learning models may calculate the probabilities of the extreme event risk score 135. The probabilities may be visually indicated by the weight of the edges in the decision tree, as set forth in, for example, FIG. 2. The edges in the decision tree 120 may initially be a similar weight, but the system may use the machine learning models to determine information and answer questions that may change the edge weights as more is known about the site or a more accurate model is trained. The outcome nodes of the decision tree may be different sizes and colors depending on severity of the outcome. The severity may include, for example, an outcome of no remediation required, an outcome of remediation required, or an outcome of no further action (NFA). Figure FIGS. 2A and 2B show a hypothetical decision tree based on only a portion of an example regulatory framework. As set forth in FIG. 1, the process of defining portfolio priorities 105 (with the operational environment 110 and the legislation 115) helps determine the questions to ask. The data environment 125 may be created to save such questions. The system mines the data in data mining 130 for the purpose of answering the questions saved in the data environment 125. Example questions may include Is source soil impact adequately characterized by a certain method?, Are light non-aqueous phase liquids (LNAPL) present?, Is groundwater present?, Does contamination leach to groundwater?, Do groundwater concentrations exceed site-specific criteria or levels?, Are there preferential pathways for shallow groundwater or vapor migration?, Does the plume extend off property?, Is the site a current or future potable water source?, Is shallow groundwater present?, etc.

Figure 3:
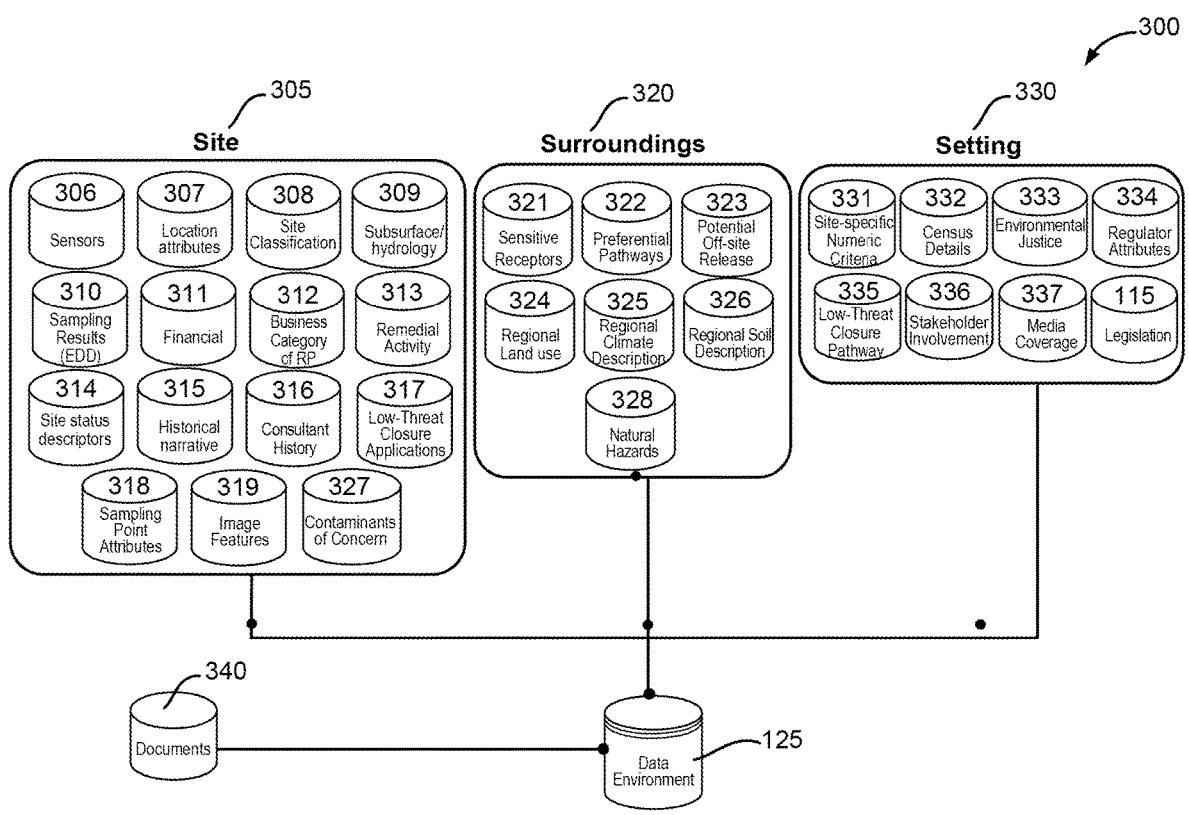
FIG. 3 shows an exemplary flowchart of the separation of the characteristics of the remediation risk into compartments as part of the data environment, in accordance with various embodiments.

In various embodiments, and with respect to FIG. 3, the system may separate or filter all (or a subset of the) characteristics of the remediation risk into compartments such as, for example, site 305, surrounding 320 and setting 330. Users may also separate or filter all (or a subset of the) characteristics of the remediation risk into compartments. Aside from the conceptual importance of each compartment, the system selects some or all of the data in each compartment that should be collected for a site. The system may determine which database or type of database for storing the selected data. For example, the system may separate the datasets of the site from the datasets of the surroundings and setting. The system may also determine how the site should be adequately rated based on the data. The system may also categorize data sources as belonging to one of the compartments which helps the system better predict a site's outcomes.

The system may include a data environment 125 that includes the site, surrounding 320 and setting 330 compartments along with documents 340. Exemplary details of creating the data environment 125 are set forth in FIG. 3. The site 305 compartment may include the physical location of the site and the location-specific contamination risks. The location-specific contamination risks may include site 305 data sets such as, for example, contaminant concentration, geology, groundwater gradient and/or presence of preferential pathways. The surroundings 320 compartment may include the risk drivers surrounding 320 the site such as, for example, sensitive receptors, offsite sources and/or possible co-mingled plumes, zoning or the amount of development in the surrounding area. The setting 330 component may include the non-physical constraints affecting budget, timeline, and/or the pathway to liability reduction and/or closure. The pathway to liability reduction and closure may include regulatory realities such as the realities governing enforcement. The setting 330 component may also include social and/or economic factors related to the geography in which a site exists such as, for example, demographics, environmental justice considerations and/or nearby property transactions. Such data may be acquired from, for example, public databases of contaminated sites; responsible party records and databases; third-party data products; U.S. Census data; scientific sources published by government entities (e.g., the USGS or USDA); and/or other scientific findings.

The risk of a site may change over time due to, for example, remediation, legislation, political forces and/or attenuation of chemicals to a lower concentration due to removal, destruction, dilution and/or dispersion. As such, the system may classify risk to quantitatively understand how the risk is influenced by various factors. In various embodiments, as set forth in FIG. 1, the system may provide an overall risk analysis process. The system may define the initial risk score ($R_0$) 170 as a function of all three compartments (site 305, surroundings 320 and setting 330). The initial risk score ($R_0$) 170 may be determined by taking the extreme event risk score 135 in the context of the information depth score 165. The system may presume that the attributes of the compartments may change over time. In various embodiments, the remediated risk $R_M$ value may be calculated by taking the product of the initial risk score $R_0$ and remediation score M(t) 160 (e.g., M(t) as obtained in FIG. 6) for any time point (t). All of $R_M$, $R_0$ and M(t) are assumed to be dynamic in time. The total expectation of the risk (R) may be calculated by taking the integral of remediated risk $R_M$ over any change in time (delta-t).

The system may also quantify the effect of remedial selection as a remediation score M(t) on the initial risk score $R_0$. The effect of remediation on the initial risk score $R_0$ may increase or decrease the initial risk score $R_0$ by some value for any time point (t). In various embodiments, the initial risk score and the effect of remediation may be combined to compute the risk at any time point (t) by a calculation of remediated risk using the equation $R_M = R_0 * M(t)$.

Once the remediated risk score $R_M$ 175 is determined for a site, this risk may then be taken in context with the quality of data available for each site (as shown by the information depth scoring 165). In various embodiments, the system may incorporate the remediated risk score $R_M$ 175 and information depth to produce a risk rating 180.

As set forth in FIG. 1, in various embodiments, the system may define the portfolio priorities 105. The system may use the operational environment 110 and the legislation to define the portfolio priorities 105. The system may use the portfolio priorities 105 in the creation of the data environment 125. Portfolio constraints define the framework under which each site must operate. In various embodiments, the system may obtain the portfolio constraints that may encode the portfolio priorities 105 of managers who know and oversee the progression of these sites. Defining these portfolio priorities 105 helps describe the overall set of data that may be used to adequately characterize a site, with respect to the risk compartments. The system may obtain this portfolio priorities data, as set forth in FIG. 1.

With continued reference to FIG. 1, in various embodiments, the system may define portfolio priorities 105 by incorporating data about the operational environment 110 of an organization. The operational environment 110 may include, for example, the number of sites or portfolios the organization may maintain, the similarity of the sites controlled by the organization, the regulatory stages of the sites, the kind of data that is currently captured, whether the data is captured digitally, a structure of the data or data architecture currently in place, and/or the extreme event(s) whose risk should be modeled. The similarity of the sites may be calculated via multivariate clustering of features from each of the site, surroundings, setting compartments. Multivariate clustering is an unsupervised machine learning technique that calculates which observations from a dataset belong together based on multiple features. Clustering algorithms may include k-means clustering, density-based spatial clustering of applications with noise (DB SCAN), hierarchical clustering, or similar. The system may also obtain an understanding about the organization's current data practices such as, for example, the kind of data that is currently captured, whether the data is captured digitally, the structure of the data and the data architecture currently in place. The system may link the organization's current data.

With continued reference to FIG. 1, in various embodiments, the system may define portfolio priorities 105 by incorporating data about the legislative environment 115 (also shown in FIG. 3). The system may send the legislative environment 115 data into a decision tree 120 and a remediation score 160. The setting 330 component of risk may include the legislative environment 115 that may induce a decision pathway for the sites. The legislative environment 115 may include the sequence of actions that may be taken and may be dependent on previous actions. Such actions may typically be driven as new information is known about a site. For example, a State's legislation may require site managers to initially confirm whether groundwater is present at a certain depth. Personnel may gather the data to answer this question. The system may determine the next course of action based on how the data suggests the question should be answered. The system may represent these courses of actions and decisions as a flow diagram, as set forth in FIG. 2.

In various embodiments, the system may generate State-specific decision trees 120 automatically from a set of algorithms that ingest legislative documents 340 directly. The algorithms may consist of various artificial intelligence (AI) models, such as deep learning models and natural language processing (NLP) routines and subprocesses. The system may save the legislative documents 340 as text documents 340 in the data environment 125, and subsequently parse and convert the text documents 340 to a directed graph. Additional details about parsing and converting text documents 340 of legislation to a graph object may be found in Joshi, K. P. & Saha, S. A Semantically Rich Framework for Knowledge Representation of Code of Federal Regulations. Digit. Gov. Res. Pract. 1, 1-17 (2020), the entire contents of which are hereby incorporated by reference in its entirety. The knowledge detected may include, for example, deontic expression to identify legal requirements; cross-references between different chapters, subchapters, parts or subparts of the legislation to enable continuity of flow; numeric criteria presented in tables; and prescribed actions. The system may tag this information as either decision nodes (e.g., where a question must be answered) or outcome (leaf) nodes (e.g., where prescribed action must be taken by a responsible party).

In various embodiments, the system may convert the extracted knowledge features to a directed graph or decision tree 120, as set forth in FIGS. 2A and 2B. FIGS. 2A and 2B show a hypothetical decision tree based on only a portion of an example regulatory framework. FIGS. 2A and 2B show a visual indication of the decision nodes, example questions, leaf node outcomes, outcome descriptions and decision paths to traverse the nodes, in accordance with various embodiments. While the Joshi process may encode all the regulatory language, in various embodiments, the system may infer when one action directs another. Thus, that sequence of prescribed events may be converted to a directed graph, which is a mathematical object that describes objects (nodes) and the directional relationship between them (edges). Directed graphs enable the graph to enforce directionality constraints on nodes, thus encoding causality and/or sequence. For example, A→B implies that nodes A and B are connected by an edge and implies that B receives information from A, but not the other way around. The directed graph may represent one aspect of an actual State regulatory framework. The directed graph may include different types of nodes such as, for example, decision nodes (e.g., D1-D5) and leaf (or outcome) nodes (e.g., O1-O3), as set forth in FIGS. 2A and 2B. The outcome nodes may describe a final action or risk category that may be assigned to a site if that node is traversed. In some cases, a node being traversed may result in a required action, such as nodes O2 and O3, in which case remediation may be required. In other cases, a node being traversed may indicate a permission, such as with node O1, where if traversed no (or a small amount of) remediation may be required and the site may be eligible for closure. Outcomes may also include, for example, the requirement to conduct additional sampling until a specific constituent falls below a threshold concentration for a defined period of time; carrying out of a desktop study of nearby potential sensitive receptors; the requirement to conduct remediation (e.g., in a prescribed manner); precluding or delaying the ability for a site to obtain a No Further Action; conducting negotiations with land owners; and/or investigating the feasibility of a restrictive covenant. Some outcome nodes may contain attributes that denote the relative risk of that node being traversed. In the example provided in FIGS. 2A and 2B, the assumed relative risk of traversing the outcome nodes would be O3>O2>O1, however these assignments would be prescribed in defining portfolio priorities 105.

The decision nodes of the decision tree 120 may contain an additional attribute: The binary (Yes/No) question that must be answered at that stage of the regulatory process (e.g., when the node is traversed). In this way, decision nodes may have a minimum in-degree of one and minimum out-degree of two, with the exception of the root node (e.g., D1) with an in-degree of zero. The out-degree of all outcome nodes is zero. A decision node may have an out-degree of more than two if a Yes/No answer leads to multiple child nodes. As an example, the decision node D3 in FIGS. 2A and 2B has two out-going Yes edges, indicating multiple courses of action may be required if D3 is answered Yes. The system may further define a decision path as the complete set of decision node attributes required to navigate the tree until no more outcome nodes may be reached. As an example, in FIGS. 2A and 2B, the decision path to traverse outcome node O1 is {D1: No, D2: No, D3: No}, since the question attributes of D1, D2 and D3 must be answered No, in that order. In other cases, there may be multiple decision paths that traverse a given outcome node, such as with O2. This node can be reached in exactly two ways in the example decision tree 120. The system may include decision paths that traverse multiple outcome nodes, and these outcome node attributes may be ensembled. The system may presume that multiple outcome nodes may be created for any given decision pathway. In various embodiments, the system may generate a final set of leaf nodes that collectively represent the risk of a site. The system may calculate answers to decision node questions using the data environment 125. In various embodiments, the system may use data mining 130 to answer the questions. For example, a site manager may be required to calculate whether Benzene has exceeded the site-specific threshold at any downstream wells or wells adjacent to a property boundary. To answer this, with respect to FIG. 3, the system may access the location of sampling points from the sampling point attributes 318 and combine it with the groundwater gradient from subsurface/hydrology 309 to determine which wells may be downstream at the site. The system may then query the maximum Benzene results from these wells using Sampling Results 310 and compare these maxima to site-specific numeric criteria 331 for Benzene.

In various embodiments, the decision tree may contain two types of edges: Yes and No, and these may contain attributes that reflect marginal probabilities of the parent node being answered yes or no. A marginal probability may be the probability of the given node being answered yes or no. Each decision node must be answered yes or no, and the marginal probability enables a prediction as to how the node may be answered. The edges from a given decision node may sum to 1. Prior to a decision node's question being answerable, these probabilities are estimated. Once the answer is known, the system updates these probabilities to either 100% Yes or 100% No. The system may estimate the marginal probabilities using binary classification machine learning algorithms, as discussed herein. As an example of the above description, assume a site operating in the legislative environment represented by the decision tree in FIG. 2.

At time t0, the site has not been characterized enough to answer any of the questions, and all probabilities are estimated. The probability of a full decision path is the product of the marginal probabilities, conditioned along the decision path. As an example, if the probability of D1=Yes is 0.5 and the probability of D5=Yes given D1=Yes is 0.3, the cumulative probability of traversing O3 at t0 is 0.5×0.3=0.15. As another example, at time t1, D1 has been calculated definitively (as opposed to estimated) using data in the data environment 125 as Yes. Now, the probabilities may adjust such that the probability of D1=Yes and the probability of D5=Yes given D1=Yes is 1 and is 0.4. The probability of traversing O3 at t1 is 1×0.4=0.4. The system may calculate probabilities in this way dynamically for every time point (t) such that all marginal and cumulative probabilities of the decision tree are known or estimated.

Regulations may change over time. Therefore, the system may generate multiple decision trees 120 for each legislative environment. Each decision tree 120 may represent the legislative environment 115 for a period of time. The system may match a regulated site to the legislative environment 115 that governed the site's management for the appropriate period of time, if the corresponding documents are available to the system.

In various embodiments, the system may design a decision tree 120 such that the risk of a site may be estimable for any regulatory stage of a site. The regulatory stages may include, for example, site assessment, investigation, remediation, monitoring and closure. The ordering of the regulatory stages may vary, and in certain cases, some regulatory stages may be skipped. However, many contaminated sites progress through this process. In general, regulatory stages tend to approximately follow the life cycle development of a conceptual site model as presented by the United States Environmental Protection Agency (USEPA). Additional details about the regulatory stages and life cycle development may be found in U.S. EPA. Environmental Cleanup Best Management Practices: Effective Use of the Project Life Cycle Conceptual Model. EPA 542-F-11-011. 1-12 (2011), which is hereby incorporated by reference in its entirety for all purposes. In general, the earlier a site is in its life cycle, the higher the uncertainty in potential outcomes. This uncertainty often translates to increased risk, so the system may explicitly encode this increased risk into the decision tree 120 for a site.

The site decision tree 120 may also define the most critical data that should be assembled in the data environment 125. The system may answer the decision nodes using data from one or more of the site 305, surrounding 320 or setting 330 compartments, and such answers may be calculated programmatically. As such, the system aggregates the data used to answer the questions. To implement this dependency, the system may also use decision tree 120 for the creation of data environment 125, as set forth in FIG. 1.

Figure 4:
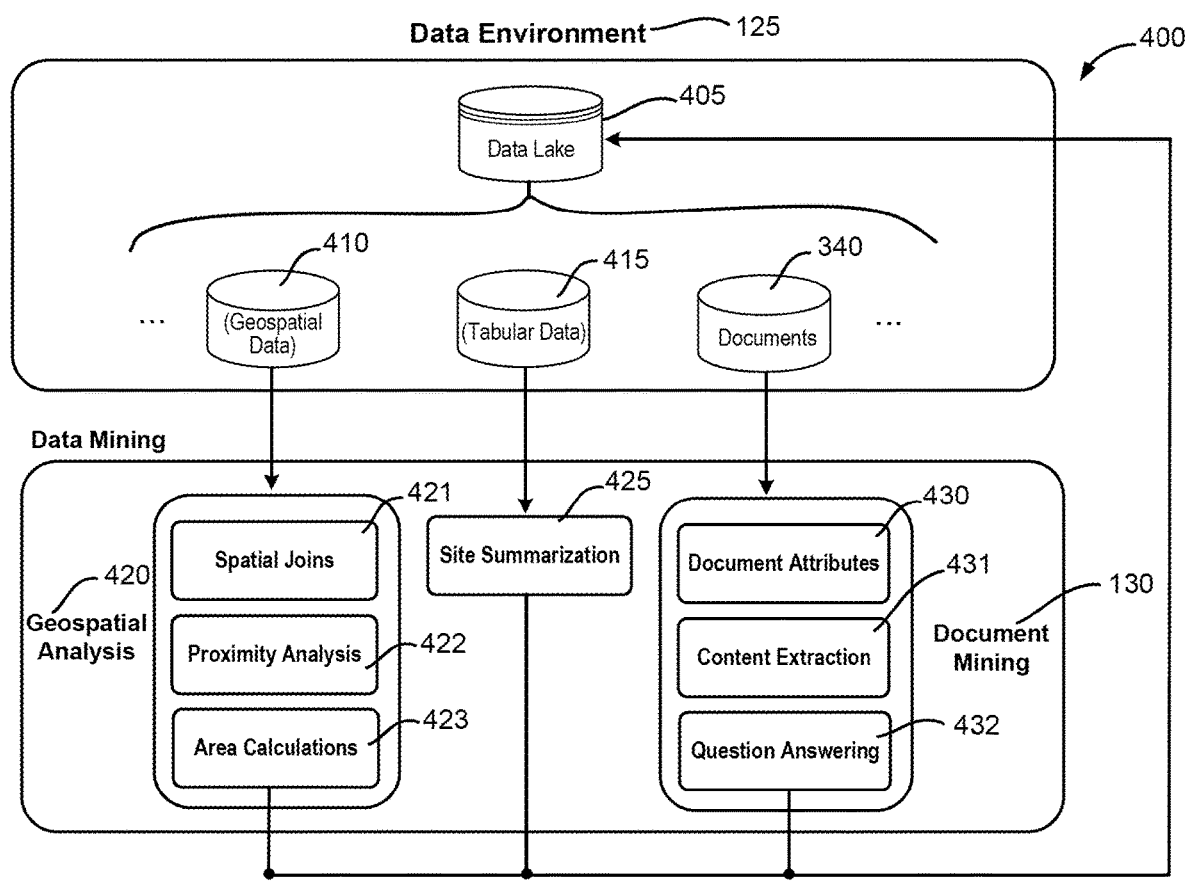
FIG. 4 shows an exemplary flow chart of the creation of a data environment, in accordance with various embodiments.

In various embodiments, as set forth in FIG. 4, the system may create and/or obtain a data environment 125 for a site, wherein the data environment 125 is a collection of all (or any subset of) the information that could be pertinent for a site. The data environment 125 may consist of, for example, databases, a data lake 405, APIs to third party data sources, and/or telemetric technologies. The system may use the raw information describing the site 305, surroundings 320 and setting 330 of a given site that is obtainable from the data environment 125. The data environment 125 may consist of raw data sources, documents 340 and files. The system may also store the results of subsequent data mining 130 back in the data environment 125, as described herein.

The system may create the data environment 125 by defining a set of data that collectively describes a site. A baseline of site data may include datasets that are commonly available for sites. The baseline site data for the data environment 125 may be subsequently adjusted to fit the portfolio constraints.

The baseline site data may contain rich information about the different risk compartments of a site 305, its surroundings 320 and its setting 330. The system may create the baseline site data in a way that explicitly accounts for each of these risk compartments. The system may create a data environment 125 to house all (or any subset) of the baseline site data and any adjustments for each site in a portfolio. The data environment 125 may include documents 340 for any site. While this document data is by definition unstructured, the document data may be a feed source for data mining 130, as described herein.

In various embodiments, with reference to FIG. 3, the system may obtain baseline site data that may include one or more of the following data. However, it should be noted that the system may still calculate an initial risk score ($R_O$) 170 even without the baseline data environment 125 datasets for a site or portfolio. As discussed below, an information depth score 165 may still be calculated based on availability of priority data and the information depth score 165 may still be used to ensure only sites with similar information depth scores 165 are compared.

In various embodiments, the system may collect data from the site 305, surroundings 320 and settings 330 compartments from, for example, files owned by the responsible party (e.g., Word documents, PDF documents, spreadsheets, or databases), public databases or websites tracking the progress of contaminated sites, and/or U.S. federal geographical information system (GIS) datasets on soil, climate, land cover, and demographics (e.g., SSURGO, Census and/or LandCover datasets). In some cases, desired data may not be freely available through public sources or maintained by the responsible party. In such cases, system may purchase data from dedicated vendors that maintain curated datasets. Examples of such datasets may include national parcel-level metadata (e.g., parcel size, zoning, and history of ownership).

In various embodiments, the system may collect site data from certain sites using telemetry technology (e.g., sensors 306). The telemetric technology may include, for example, telemetric monitoring of groundwater for water levels, LNAPL thickness, temperature, conductivity, turbidity, total suspended solids (TSS), dissolved oxygen, pH acid, chlorides, nitrates, and metals. Lab-on-a-chip sensors may be deployed to monitor groundwater for specific constituents like Perfluoroalkyl and Polyfluoroalkyl Substances (PFAS) at very low levels with high specificity. Gas sensors may be used to monitor indoor air quality in buildings above contaminated soil. In this way, a multiplicity of site data may be accessed from remote sensing devices and fed into the system. The system may also include telemetric monitoring of gases for suspended particulates, specific compounds (e.g., Oxygen or Benzene), various volatile organic compounds (VOCs) and photoionization detector (PID) readings. Some of these telemetric devices may be installed in physical locations on or around the site. Some of the telemetric devices may be mounted to unmanned aerial vehicles (UAVs) to enable spatially controlled detection capabilities. UAVs may also be equipped with cameras at different spectral bands to detect large-scale temperature changes, to detect gas leaks and/or to infer changes in landscape from aerial imagery. These telemetric devices may operate using industry-standard technologies that feed data through cellular networks to the cloud infrastructure, which is then transferred to the system.

The system may obtain a description of a site's location attributes 307 (e.g., coordinates and/or address). With respect to site classification 308, the system may obtain metrics for the type or classification of site with consideration for certain details such as, for example, the nature of contamination (e.g., chlorinated versus non-chlorinated organic compounds), business process leading to contamination (e.g., leaking underground storage tank containing fuels; pipeline releases; releases from solvent tanks at chemical manufacturers, etc.); site size, age, and overall complexity. With respect to subsurface and/or hydrology 309, the system may obtain a vertical soil profile for boreholes and test pits previously drilled or excavated at a site. The system may also obtain data about groundwater depths and hydraulic gradient (e.g., over time).

With respect to sampling results 310, the system may obtain data about the laboratory analytical results from any field sampling activities, which could include any environmental medium present at a site such as, for example, groundwater, soil, vapor, soil vapor, and/or surface water. The system may also obtain data about the sampling of influent and effluent of remediation systems, pits or other engineered systems. These sampling results may be stored in electronic data deliverable (EDD) format, which is EPA's standard for Superfund sites. Additional details about the EDD format may be found in USEPA. Region 2 Superfund: Electronic Data Deliverable (EDD) Frequent Questions. Region 2 Superfund: Electronic Data Deliverable (EDD) Frequent Questions www.epa.gov/superfund/region-2-superfund-electronic-data-deliverable-edd-frequent-questions #1 (2022), the entire contents of which are hereby incorporated by reference in its entirety for all purposes.

With respect to financial data 311, the system may obtain data about budgets, historical spend, and/or provision of a site by a responsible party. The system may interface with the responsible party's financial system or spreadsheets to obtain historic and current budgets and spend and provision forecasts. The system may also obtain data about a business category 312 or a classification of the business type of the responsible party. Such category or classification details may be summarized using a standard such as the North American Industry Classification System (NAICS) codes. The category or classification details may also be subdivided into business segments within the industry. For instance, some oil and gas companies may operate pipelines, refineries, terminals, bulk fuel storage facilities, and gas stations.

The system may obtain data about remedial activity 313 which may include records of past or current remedial alternatives for sites. The remedial alternatives may include passive or active systems, as long as they are considered a formal remedy by a site's regulator. The system may also obtain the operations and maintenance data for past or existing active remediation systems which may include, for example, flow rates, on/off times, mass removals, record of assets, installation dates, etc. The system may obtain data about site status descriptors 314 that may include a time-stamped log of the progression of a site through its regulatory stages to-date. The system may obtain this site status descriptor data from State databases tracking contaminated sites, or the data may be mined from documents 340 as described herein. The system may obtain historical narrative data 315 that may include a block of text with a description detailing basic characteristics of a conceptual site model such as, for example, reason of release, contaminants of concern (CoCs), actions taken to date, and physical setting 330. The system may obtain consultant history data 316 that may include a time-stamped list of consultants hired to manage the site on behalf of a responsible party. The consultant history data may allow for subsequent calculation of parameters such as, for example, number of consultants, turnover rate, average consultants per year, etc. The system may obtain data related to low-threat closure applications 317 that may include running logs of a site's progress toward low-threat closure such as, for example, running check-list status values, formal application dates and nature, etc. The system may also obtain data related to sampling point attributes 318 and/or image features 319. The system may also obtain data about contaminants of concern 327 which may include a list of known or suspected contaminants that may have been released. The information about the contaminants of concern 327 may describe some or all of the toxicological or environmental risk present at the site.

With further reference to FIG. 3, the system may obtain baseline surroundings 320 data that may include one or more of the following data. The system may obtain data from sensitive receptors 321 that may consist of locations at or near a site that could be adversely impacted if contacted by contamination under prescribed conditions. Examples of sensitive receptors may include humans breathing contaminated indoor/outdoor air; wetlands; schools; public drinking water wells; water bodies; natural habitats; etc. The system may obtain the sensitive receptors data in a geographic information system (GIS) geodatabase, shapefiles, or similar. The system may also obtain the sensitive receptor data from public databases, public and private record drawings, agency/municipality correspondence, and document mining. The system may further obtain the sensitive receptor data from the results of existing and on-going desktop evaluations to define the "Physical Setting 330" section of a site's Remedial Investigation and Feasibility Study reports.

The system may obtain data about preferential pathways 322 that consist of any subsurface structures (generally manmade) that can serve as a more rapid conduit for off-site contaminant migration, such as underground utilities (e.g., pipelines). Preferential pathways may increase the risk of rapid, unexpected contaminant migration. The system may obtain the data in GIS form from respective public or private entities who manage this infrastructure. The data may also be created through a utility survey. The system may also obtain data about potential off-site releases 323.

With continued reference to FIG. 3, the system may obtain data about regional land use 324. Regional land use may include a description of the land cover around a site. Classifications of land cover may provide an indication for how populated a region is, and further evidences its agricultural activity, prevalence of water, presence of wetlands, etc. The system may download such data at 30 m resolution from the United States Geological Survey (USGS). Additional details about the USGS may be found in USGS. National Land Cover Database Overview. www.usgs.gov/centers/eros/science/national-land-cover-database#overview (2019), the entire contents of which is hereby incorporated by reference in its entirety for all purposes.

The system may obtain data about regional climate descriptions 325 that may include a description of the climate in which a site exists. The description of the climate may include, for example, rainfall, humidity, temperature, evapotranspiration, radiation, mean wind speed and direction, cloud properties, risk of natural disasters, etc.

The system may obtain data about regional soil description 326, which may be similar to the subsurface/hydrology of a site, but on a regional level so as to indicate the broader subsurface context of a site. The date may include variables such as soil types, depth to water, slope, hydraulic gradient, etc. The United States Department of Agriculture (USDA)'s Natural Resources Conservation Service maintains a national survey of soils in the SSURGO database. Additional details about the SSURGO database may be found in USDA. Natural Resources Conservation Service Soils United States Department of Agriculture Land Degradation: An overview at www.nrcs.usda.gov/wps/portal/nrcs/detail/soils/survey/?cid=nrcs142p2_053627 (2021), the entire contents of which is incorporated by reference in its entirety for all purposes.

With continued reference to FIG. 3, the system may obtain data about natural hazards 328 to capture extreme weather, wildfire and earthquake event probabilities whose severity and frequency may change over time. Examples hazards may include heat waves, earthquakes, wildfires, hurricanes, floods, etc. The system may download the corresponding datasets from US federal government websites such as www.usgs.gov/search?keywords=Natural%20Hazards), the entire contents of which is incorporated by reference in its entirety for all purposes.

With further reference to FIG. 3, the system may obtain settings 330 data that includes one or more of the following data. The system may obtain data about site-specific numeric criteria 331. Many sites may have a set of quantitative thresholds for specific contaminants, such as Benzene or Total VOCs. These thresholds often exist for a variety of contaminants, media, exposure routes, and beneficial reuse. In some cases, these thresholds are set specifically for a given site. At other times, State-wide values may be used. In the absence of these thresholds, USEPA's Maximum Contaminant Level (MCL) for drinking water may be adopted.

The system may obtain data about census details 332 that may include demographic information about the geographic region in which a site exists. This demographic information may include parameters such as, for example, income, employment, education level, household value, etc. The system may obtain data about environmental justice 333. Environmental justice may be related to census, but environmental justice may include pre-determined figures of merit that may suggest the potential for disproportionate pollution burden borne by specific populations. An example dataset may include CalEnviroScreen (www.calenviroscreen-oehha.hub.arcgis.com) for California. The system may obtain data about regulator attributes 334 that may include quantifying the effect that the regulatory agency has on site closure timelines. For example, regulator attributes may include metrics that indicate case backlog such as, for example, number of sites per caseworker, total number of sites, and/or median site closure times. The system may obtain data about whether a regulatory pathway exists for a site that includes a risk-based, low-threat closure pathway 335. These pathways may exist in some regulatory jurisdictions, and provide the ability for responsible parties to demonstrate through site-specific data that no threat exists under certain conditions. The system may obtain data about stakeholder involvement 336 that may include information that reflects the extent to which stakeholders (e.g., property owners or environmental groups) may affect the timelines a site. The system may obtain data about media coverage 337 to determine whether any media attention has been focused on the site. This may include syndicated media or social media.

As set forth in FIG. 4, in various embodiments, the system may further process (e.g., as set forth in flowchart 400) the raw datasets collected in the data environment 125 from some sites using data mining 130, which may create the metrics that may be directly analyzed to determine the potential risk indicators for a site. As an overview, in various embodiments, the data environment 125 may include a data lake 405. The data lake 405 may include geospatial data 410, tabular data 415 and documents 340. The system may perform data mining using geospatial analysis 420 and/or document mining 130. The system may conduct geospatial analysis 420 on the geospatial data 410 by conducting spatial joins 421, proximity analysis 422 and area calculations 423. Spatial joins may involve appending attributes from one dataset to another based on some geospatial relationship the datasets share. For example, the system may append the median income for the Census tract in which a contaminated property exists. This can be accomplished with a spatial join between a table where each observation corresponds to a distinct contaminated site, to a table where each row corresponds to a distinct census tract. The values from the latter table may be appended to the former table only for the Census tract observation in which the contaminated site exists. Proximity analysis may involve comparing the distance between multiple points and may include determining, for each contaminated site, the distance to the nearest sensitive receptor of a given type. Area calculations simply involve calculating the area of a geospatial polygon.

In some cases, the raw data may include geospatial data 410 consisting of data types that encode attributes of a specific geographical area or feature. Examples of geospatial data may include property boundaries or census parcels. In various embodiments, the system may summarize and convert the raw data to a tabular format and store the tabular data 415. The raw data may already be tabular, but the raw data may be too granular to be directly relevant as a site-level feature. For instance, the system may obtain sampling results as a time series by location, matrix and analyte. To create metrics from this tabular data that represent a site as a whole, the system may apply various site summarizations 425. For example, EDD data may have many observations per contaminated site. To summarize this dataset for a given site, the system may calculate the number of times that a given compound was detected for a given environmental matrix. The system may also, for a similar chemical and matrix, calculate the maximum concentration ever observed. By continuing in this way, the system may calculate many features based on the EDD data, each of which has only one value for a given site.

In various embodiments, the system may conduct document mining 130 of the documents 340 to obtain risk indicators. Document risk indicators may include various document attributes 430. The document attributes may include, for example, date of document preparation; professional service contractor who prepared a report; the document's classification; prevailing groundwater flow direction as indicated in a document; subsurface soil type; and/or regulator opinions and acceptance of proposed actions. Additionally, specific types of documents 340 may contain specific information, so the system may conduct content extraction 431. For instance, soil boring logs may be a common document type encountered in contaminated sites. From the soil boring logs, the system may conduct document extraction 431 to extract the subsurface lithology as a function of depth which the system may use to create a site-specific subsurface map. The documents 340 may also include laboratory analytical reports, which are commonly appended to larger reports submitted to regulators. Laboratory analytical reports may contain sampling result data, that is not found in tabular form elsewhere. The system may extract and convert to tabular form these sampling result data tables. The document mining 130 process may also include question answering 432.

Figure 9:
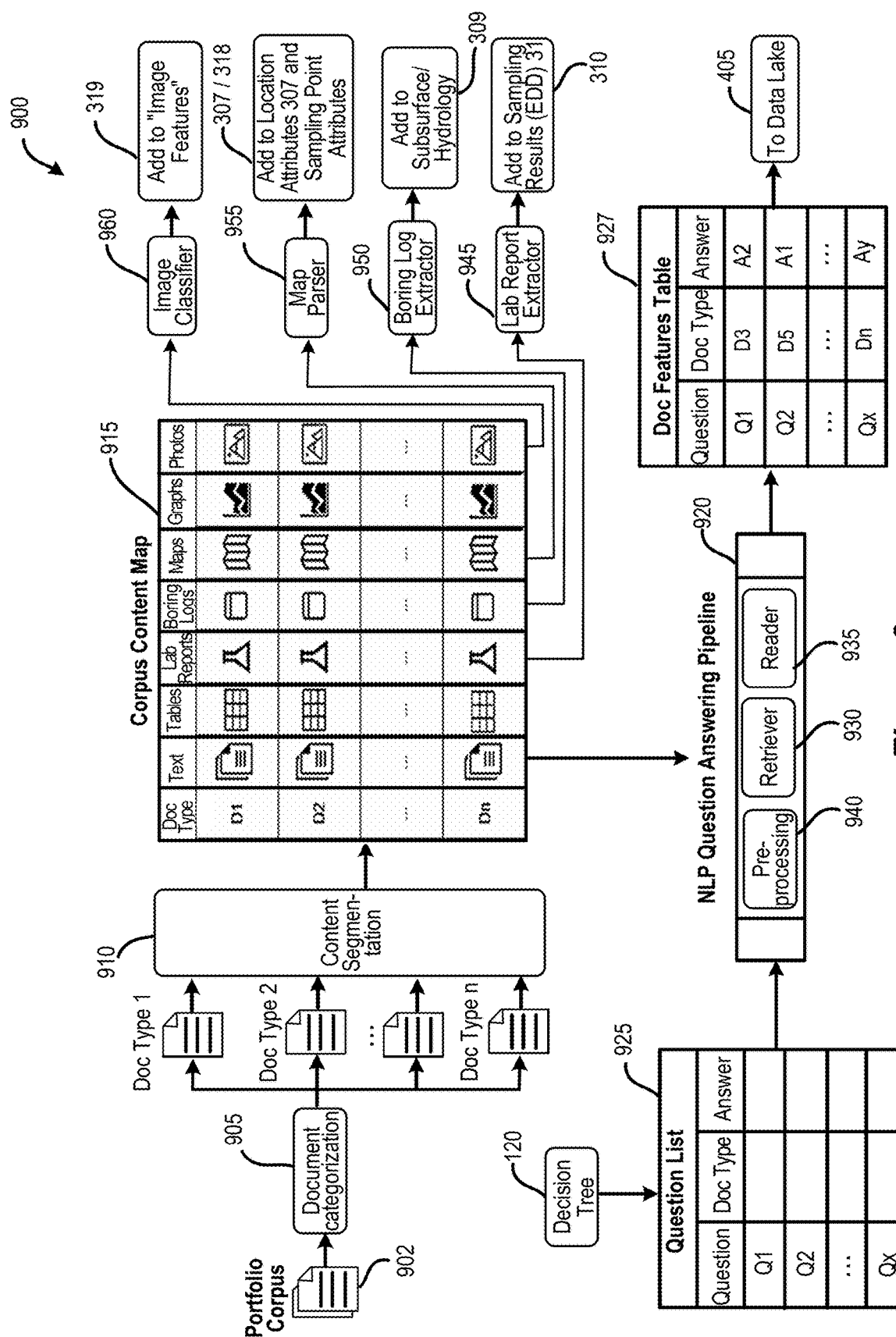
FIG. 9 shows an exemplary flow chart of an exemplary document mining process, in accordance with various embodiments.

With respect to FIG. 9, in various embodiments, the system may conduct a document mining method 900 by accessing the portfolio corpus 902 (collection of all documents) for the site or portfolio from the data environment 125. The system may categorize the documents 905 using unsupervised or supervised techniques. If meaningful document category labels are not available, the system may use unsupervised learning. For example, the system may calculate document embeddings for each document using TF-IDF vectors, word2vec representations, BERT features and/or similar items. The system may cluster document embeddings using clustering techniques such as, for example, k-means, DBSCAN, hierarchical DSCAN (HDBSCAN) and/or similar techniques. In the case of k-means, the system may use the elbow point detection method to determine a statistically optimal value for k. The system may use supervised learning, if meaningful document assignments are available. In this case, the system may use document classification to categorize the documents. The system may use common supervised classification algorithms such as, for example, logistic regression, support vector machines, linear discriminant analysis, neural networks and/or similar algorithms. Document categorization 905 may produce some number n document types. These document types may include, for example, Phase I or Phase II Environmental Site Assessments (ESAs), remediation feasibility reports, sensitive receptor surveys, remedial progress reports, corrective action plans, remediation evaluation reports, routine groundwater reports, soil monitoring reports, requests for closure, regulator opinions and/or regulator correspondence.

The system may use content segmentation 910 to further categorize each section of a document by its type. Content segmentation 910 may rely on computer vision. The system may use a convolutional neural network to determine the overall look of a section by its layout and classify it as one of a pre-defined number of categories. The system may define these categories in the training process of the convolutional neural network. The system may also rely on NLP techniques for content segmentation by performing, for example, paragraph-wise text classification. The section-wise classification may produce a corpus content map 915, which may assimilate all the similar types of content for similar types of documents.

The system may apply to this content map custom logic that is specific to the content and document extracted, as follows. The system may pass the text to an NLP Question Answering Pipeline 920. The Question Answering Pipeline 920 may receive an additional input of the site-specific or portfolio-specific Question List 925, which may be generated from the decision nodes of the decision tree. The NLP Question Answering Pipeline 920 may use a retriever-reader architecture question-answering pipeline to search for the appropriate text sections that map the questions. The retriever 930 may rely on rapid document querying technologies (e.g., ElasticSearch) to rank the available text passages by their contextual similarity to a given question. The retriever 930 may additionally rank each type of document by its applicability to a given question. In response to the system identifying the ranked list of document types and passages, the system passes these items to the reader 935. The reader 935 may include a BERT encoder model fine-tuned to the question answering objective of a similar corpus. The Retriever-Reader architecture may be preceded by an NLP preprocessor 940, which may perform standard NLP preprocessing steps such as, for example, normalization, stemming, lemmatization, stop-word removal and tokenization. The output of the NLP Question Answering Pipeline 920 may be a document features table 927 that may include a set of answers, with maps to which types of documents provided the answer for each question. The system may pass the pages containing lab reports and boring logs to custom extractors (e.g., Lab Report Extractor 945 and Boring Log Extractor 950, which may utilize similar NLP and computer vision algorithms to create tabular data from these pages. The results may be added to the respective datasets in the data environment 125. The system may pass map content to a Map Parser 955, which may reverse engineer geospatial data from the map. Various content may be extracted from the maps such as, for example, aerial imagery, location of sample points, property boundaries, and/or plume geometries. The system may pass image content to an Image Classifier 950 that may be trained to classify images. This functionality may be used for documents like Phase I Environmental Site Assessment reports, which may contain photographs taken at a site under investigation. Photographs may reveal damaged equipment, potential locations of leaks and/or other risk factors that should be documented.

The system may feed the results of the geospatial analysis 420, site summarization 425 and document mining 130 back into the data lake 405 of the data environment 125. The system may also characterize each site by the data to the maximum extent possible.

Most U.S. states contain a list of numeric site criteria, including a variety of concentration values that, if exceeded, may trigger enforcement actions. These site criteria are specific to the analyte of interest, as well as the environmental matrix, and in some cases the exposure pathway. The system may compare the site-specific analyte concentrations to these site criteria to determine what subsequent actions should be taken at a site. The system may use the decision tree to determine what subsequent actions could be taken at the site, as these are the child nodes of decision nodes whose questions can be answered by comparing analyte concentrations. The system may compile the state-specific numeric criteria. The system may compare the state-specific numeric criteria to each other and to the federal maximum concentration levels (MCLs) set by the USEPA. The system may normalize and rank the deviations from the federal limit (high and low) for each state, to determine an overall state score that is taken as a representation of the legislative strictness. The normalizations and rank results may take the form of a percentage at which a state's value is above or below the federal level. In various embodiments, the system may average these percentages across all (or any subset of) regulated constituents. For example, a state may require that Benzene in groundwater cannot exceed 0.003 mg/L, and Toluene cannot exceed 0.8 mg/L. The system may compare these values to the federal MCL of 0.005 and 1.0 mg/L, respectively and determine that the state's Benzene criterion is lower than the federal MCL by 40% and the state's Toluene limit is lower than federal by 20%. Thus, the state is on average 30% stricter than the federal limit and would get a strictness value of −0.3. In various embodiments, the system may apply weightings to constituent values to account for different toxicological risk or site priorities.

The system may also provide a reality-check on top of the legislation by quantifying how closely regulations are followed on a State or sub-State level. The system may derive this information from numerous documents 340, including agency opinion letters, regulatory agency metadata, and correspondences. Agency opinion letters may include formal documents that are provided to responsible parties and reflect the regulator's decision regarding a proposed site action. As an example, a responsible party may believe an operational remediation system has sufficiently restored a site to contamination levels that do not adversely impact human health or the environment. The responsible party may submit this opinion in the form of a formal report to the regulator, who can disagree, agree, or request clarifying information. The responding opinions by the regulator may be documented in opinion letters, which in some States are publicly accessible. Regulatory agency metadata can be highly varied and is generally found in State databases tracking progress of contaminated sites. The regulatory agency metadata may include a detailed accounting of what regional jurisdiction a site falls under, which allows determination of jurisdiction-level attributes such as, for example, site closure rate, site backlog, tendency to prefer one remedial approach over another, etc. Taken together, such information can provide indications of regulatory resource constraints and/or preferences, which may be part of the regulatory attributes 334 in FIG. 3.

Any subset of the data in the data environment 125 may be treated as risk indicators, which may be passed as machine learning features to a supervised machine learning algorithm that estimates the probabilities of a chosen binary outcome. The system may utilize one or more algorithms to calculate these probabilities such as, for example, decision trees, logistic regression, naïve Bayes classification, K-nearest neighbors, support vector machines, and/or artificial neural networks (deep learning). The system may compare the performance of multiple algorithms. Performance metrics may include, for example, prediction accuracy, f1-score and/or AUC-ROC score. In addition, the system may utilize hyperparameter tuning to optimize the performance of a given algorithm.

With respect to FIG. 5, in various embodiments, the system may determine an extreme event risk score 135. The extreme event risk score 135 for a site may include a probabilistic rating that reflects how likely a site is to encounter a chosen extreme event. As an example, the system may choose as an extreme event that a site will take an abnormally long time to close relative to other sites. The extreme event risk score 135 may range from 1 to 5, with 1 as the lowest probability range and 5 as the highest probability range. The probabilities may be determined from a multi-dimensional statistical analysis (as set forth above) that includes some or all of the risk indicators. The probability range cutoffs may be chosen based on risk tolerances defined in portfolio priorities 105. The cutoffs may also be defined automatically by the system using statistical thresholds to constrain similar site counts within each range or enforcing a specific statistical distribution of the scores. Instead of using the probability of a long closure event, the system may use other outcomes with the same framework. In other words, in various embodiments, the system may use this process to predict any outcome the responsible party wants to understand. If they want to understand the risk of a $3^{rd}$-party liability claim, the system may model this as the extreme event. Depending on the desired outcome, the system may replace one dependent variable with another. For example, the system may initially use the time to closure as the dependent variable. The system may determine other outcomes (e.g., extreme events) including, for example, dollar amount invested in total for site; probability of legal action taken against the responsible party; and/or lost real estate value. The system may consider an extreme event as, for example, the time to closure being greater than the 80th percentile. However, the system may consider other extreme events. The system may also model cost to closure, which may be a business outcome of the extreme event. The system may also ensemble multiple extreme event probabilities into a single score.

Figure 6:
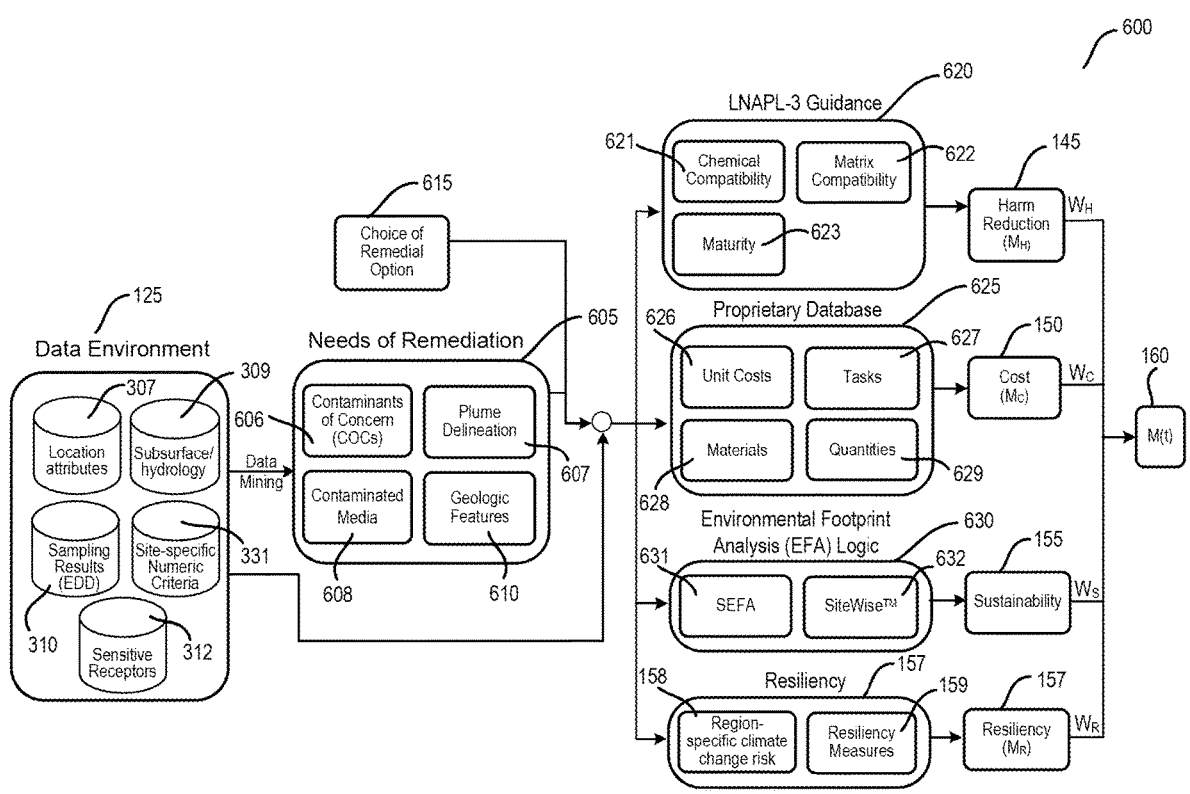
FIG. 6 shows an exemplary flow chart of the detailed process for obtaining a remediation score, in accordance with various embodiments.

As set forth in FIG. 6, in various embodiments, the system may include remediation scoring 140 of the initial risk score $R_O$ according to the calculation of remediated risk, where M(t) can range between 0 and positive infinity, with values less than 1 representing a decrease in risk resulting from remediation (e.g., lowering in the probability of extreme event occurrence). The remediation score M(t) value 160 may be treated as the balance between different remediation terms such as, for example, harm reduction 145, cost 150, sustainability 155 and resiliency 157. The system may further determine the remediation score M(t) value 160 by how it has been shown to attenuate the extreme event risk score for historical sites.

Harm reduction 145 ($M_H$) may include the ability of the remediation option to remove, destroy, dilute, immobilize and/or otherwise attenuate contaminants, rendering the contamination less harmful to human health and/or the environment. In various embodiments, the system may incorporate a regulatory framework to determine specific requirements for remediation. The evaluation criteria for remediation may include, for example, protectiveness, permanence, cost, effectiveness over the long term, management of short-term risks, the ability to implement technical and administrative functions and/or the consideration of public concerns. Protectiveness may include, for example, the degree to which existing risks are reduced, time period to reduce risk at the site, time period to attain cleanup standards, on-site and off-site risks resulting from implementing the alternative and/or improvement of the overall environmental quality. Permanence may include, for example, the degree to which the alternative permanently reduces the toxicity, mobility and/or volume of hazardous substances, including the adequacy of the alternative in destroying the hazardous substances. Permanence may also include, for example, the reduction or elimination of hazardous substance releases and sources of releases, the degree of irreversibility of waste treatment process and/or the characteristics and quantity of treatment residuals generated. The management of short-term risks may include, for example, the risk to human health and the environment associated with the alternative during construction and/or implementation, along with the effectiveness of measures that may be taken to manage such risks.

The system may determine harm reduction 145 by following the LNAPL-3 guidance 620 published by the Interstate Technology and Regulatory Council (ITRC). The LNAPL-3 guidance 620 may include chemical compatibility 621, matrix compatibility 622 and/or maturity 623. More specifically, LNAPL-3 Section 6 may provide detailed guidance on the selection of available technologies (e.g., remedial options) used for remediating LNAPL. The LNAPL-3 Section 6 may also provide screening criteria to match these technologies to the site-specific details in the site risk compartment. These details may include compatibility of the technology with different forms of LNAPL and site geology. The details may also include how each technology ranks with respect to remedial time frame, safety, maturity, etc.

The cost 150 ($M_C$) may include the financial requirement to design and enact the remedial option. The system may calculate cost 150 using a database 625 of unit costs 626, tasks 627, materials 628 and quantities 629. Remediation costs may be calculated from known or forecasted site activities. Each activity may correspond to a number of labor hours and/or quantity of materials. Unit prices for labor and/or materials may be defined in a unit cost database. The annual costs may be calculated by multiplying units by unit costs, then summed for each activity within a task. The system may represent forecasted costs using net present value as the basis.

The remediation sustainability 155 ($M_S$) term may include the environmental footprint of the remedial option. The system may estimate sustainability 155 using Environmental Footprint Analysis (EFA) logic 630. The EFA 630 may comprise The United States Environmental Protection Agency's Spreadsheets for Environmental Footprint Analysis (SEFA) tool 631 and/or SiteWise 632. Each of these tools may accept dozens to hundreds of distinct inputs, which collectively may describe the potential greenhouse gas-generating activities that could occur both directly and indirectly. Example data may include the anticipated number of trucks that would visit a site, at what frequency, and by traveling what distance. In this way, the system may estimate the emissions due to this type of transportation. Another example is electricity use to operate remediation systems. Electricity use may have different carbon intensities for different regions, and the carbon intensity may be determined by the site's location since different regions may have distinct energy portfolios. The environmental footprint analysis tools may consider these inputs and other inputs, in order to output the estimated tonnage of greenhouse gases to be emitted resulting from the described processes, as well as consumption of natural resources like groundwater.

In various embodiments, the remediation resiliency ($M_R$) 157, as shown in FIGS. 1 and 6, may include the ability of a given remediation system to withstand natural hazards risks, which may include region-specific climate change risks 158 and resiliency measures 159. Natural hazards risks may include, for example, floods, droughts, hurricanes, etc. Risks may also arise from indirect climate change effects such as, for example, socioeconomic or population-level changes that influence how the selection, operation and/or evaluation of a remediation system may be carried out. Natural hazards risks are assumed to be region-specific to account for geographic variabilities (e.g., geology, distance to coastal region, aridness of climate, etc.). Natural hazards risks may be derived using existing data products based on observed and predicted scenarios (e.g., published routinely by international (such as the IPCC), national (e.g., NOAA), and state (e.g., Cal-Adapt) agencies).

In various embodiments, the LNAPL-3 Guidance 620, database 625 and EFA Logic 630 may receive inputs from a remedial option 615 and needs of remediation 605. The needs of remediation 605 may include, for example, contaminants of concern (COCs) 606, plume delineation 607, contaminated media 608, and/or geologic features 610. As part of the data mining process, the needs of remediation 605 may receive input from a data environment 125. Data environment 125 may include, for example, location attributes 307, subsurface/hydrology 309, sampling results (EDD) 310, sensitive receptors 312 and/or site-specific numeric criteria 331.

In various embodiments, the system may normalize each remediation component score by each site to all (or a subset of) other sites in the portfolio and/or regulatory jurisdiction. The system may calculate the normalization with a z-score, min-max scaling, or similar.

In various embodiments, the system may combine each remediation term via linear combination with a weighting term, W, that determines how each term should influence the overall remediation score M(t) 160. The system may determine the weights via statistical analysis of previous sites, portfolio priorities 105, and/or knowledge of the regulatory environment's emphasis on each term.

Information depth reflects the reality that the quantity and quality information is variable between sites and portfolios of sites. Some sites or portfolios may be rich and varied in information, while others have much less data available. For sites with lower information depth, there is greater uncertainty in the risk scores. For this reason, in various embodiments, the system may only compare sites of a similar information depth. As set forth in FIG. 7, in various embodiments, the system may classify the information depth of a site as low, medium or high based on the richness and completeness of data with respect to each risk compartment.

As set forth in FIG. 8, in various embodiments, the system may characterize the information depth of a site based on the risk compartments classifications, to determine the overall information depth category for a site.

In various embodiments, the system may determine an initial risk score ($R_O$) 170 for a site using a two-dimensional score. For example, the initial risk score ($R_O$) 170 may be the single number part of 1AA, 2AB, 5AA etc. The score may include a first component (e.g., number based on the chart in FIG. 5) that explains the initial or remediated risk score and a second component (e.g., letters) that explains the information depth scoring 165 (e.g., based on the chart in FIG. 8).

Figure 10:
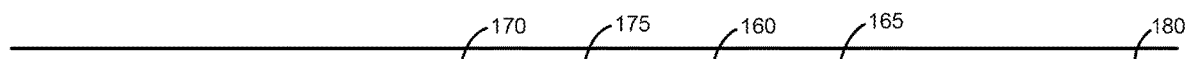
FIG. 10 shows an exemplary calculation of the risk rating for three hypothetical scenarios, in accordance with various embodiments.

As an example, consider a hypothetical site where the modeled extreme event is closure in ten or more years. The system may use a scoring engine to determine that the probability of this extreme event is 55%. The system may consider this site to have a High information value for Site, a Low information value for Surroundings 320 and a High information value for Setting 330. As such, the system may determine that the initial risk score ($R_O$) 170 for this site may be 4 and the information depth category may be AB. FIG. 10 shows an example of a step-wise calculation of the risk rating for three hypothetical scenarios.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (RDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over conventional technology by using a decentralized database and improved processing environments. In particular, the blockchain implementation improves computer performance by, for example, leveraging decentralized resources (e.g., lower latency). The distributed computational resources improves computer performance by, for example, reducing processing times. Furthermore, the distributed computational resources improves computer performance by improving security using, for example, cryptographic protocols.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE CHROME™ software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any of the communications, inputs, storage, databases or displays discussed herein may be facilitated through a website having web pages. The term "web page" as it is used herein is not meant to limit the type of documents 340 and applications that might be used to interact with the user. For example, a typical web site might include, in addition to standard HTML documents 340, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Any communication, transmission, and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word or EXCEL™, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID' operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEB SPHERE® MQ™ (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment.

Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for creating a risk rating for a site, comprising:

developing, by one or more processors, an extreme event risk score based on operational environment data, legislative environment data and a data environment;

determining, by the one or more processors, a remediation score based on a plurality of remediation terms including harm reduction data, cost data, sustainability data, resiliency data, the extreme event risk score and the data environment;

determining, by the one or more processors, how each remediation term of the plurality of remediation terms influences the remediation score by combining each of the plurality of remediation terms via linear combination with a weighting term, wherein the weighting term is determined by statistical analysis of at least one of previous sites, portfolio priorities or an emphasis of a regulatory environment on each of the plurality of remediation terms;

determining, by the one or more processors, a remediated risk score for the site based on an initial risk score and the remediation score;

determining, by the one or more processors, a risk rating for the site pre-remediation based on the initial risk score and an information depth score;

determining, by the one or more processors, the risk rating for the site post-remediation based on the remediated risk score and the information depth score;

ingesting, by the one or more processors, legislative documents from the legislative environment and into the data environment;

saving, by the one or more processors, the legislative documents as text documents in a data environment;

parsing and converting, by the one or more processors, the text documents to at least one of a directed graph or state-specific decision trees using artificial intelligence (AI) models that include deep learning models and natural language processing (NLP) routines, wherein the directed graph is an object that describes decision nodes and edges, wherein the edges are a directional relationship between the decision nodes, and wherein the directed graph enforces directionality constraints on the nodes to encode at least one of causality or sequence;

detecting, by the one or more processors, knowledge to obtain detected knowledge in the form of attributes comprising key terms, rules, topic summaries, relationships between various legal terms, semantically similar terminologies, deontic expressions and cross-referenced legal facts and rules;

tagging, by the one or more processors, the detected knowledge from the text documents as a decision node or a outcome node;

building, by the one or more processors, a knowledge graph using deep learning technologies, word embeddings, text summarization, embedded provenance and topic modeling;

extracting, by the one or more processors, cross-referenced rules from the knowledge graph;

identifying and classifying, by the one or more processors, the cross-referenced rules into the deontic expressions;

re-training, by the one or more processors, a predictive model with definitions of categories of each section of the legislative documents;

implementing, by the one or more processors, content segmentation of the legislative documents to categorize each section of the legislative documents into the categories by type;

re-training, by the one or more processors, the predictive model using the risk rating and the legislative documents;

adjusting, by the one or more processors, probabilities of the extreme event risk score based on a severity of an outcome to obtain adjusted probabilities, wherein the adjusted probabilities are visually indicated by a weight of the edges in the decision tree;

adjusting the weight of the edges in the decision tree by using the machine learning models;

computing, by the one or more processors, a training objective by re-calculating probabilities underlying risk calculations of the initial risk score, by using the adjusted probabilities of the extreme event risk score and by defining portfolio priorities with the operational environment data and the legislative environment data;

updating, by the one or more processors, the predictive model to create an updated predictive model, based on the training objective; and improving, by the one or more processors using the updated predictive model, an accuracy of the initial risk score and the risk rating to improve prediction accuracies for the other sites.

2. The method of claim 1, wherein the building the knowledge graph comprises:

extracting and validating instances of the knowledge graph using extractive text summarization, extraction of topics from summarized subsections, extraction of instances from topics and extraction of descriptions from topics;

extracting semantically similar terminologies and ontology populations; and extracting relations between key entities.

3. The method of claim 1, further comprising data mining, by the one or more processors, documents within the data environment to obtain risk indicators.

4. The method of claim 1, wherein the data environment comprises a site compartment, a surroundings compartment, a setting compartment and a data lake, wherein the data lake includes geospatial data, tabular data and documents.

5. The method of claim 1, further comprising saving the legislative documents as text documents, parsing the text documents and converting the text documents to a directed graph.

6. The method of claim 1, wherein the decision nodes of the decision tree includes an attribute, wherein the attribute includes a binary question for answering in response to the node being traversed.

7. The method of claim 1, further comprising calculating the remediated risk score from the product of the initial risk score and the remediation score for any time point.

8. The method of claim 1, further comprising calculating a total expectation of a risk by taking the integral of the remediated risk score over a change in time.

9. The method of claim 1, wherein portfolio priorities are based on the operational environment data and the legislative environment data.

10. The method of claim 1, further comprising:

obtaining, by the one or more processors, new data from other sites as part of a feedback loop to augment the harm reduction data, the cost data, the sustainability data, the resiliency data, the extreme event risk score and the data environment; and re-training, by the one or more processors, the predictive model using the new data from the other sites.

11. The method of claim 1, wherein the operational environment data is based on at least one of a number of sites or portfolios an organization may maintain, a similarity of the sites controlled by the organization, regulatory stages of the sites, a kind of data that is currently captured, whether the data is captured digitally, a structure of the data or data architecture currently in place.

12. The method of claim 1, further comprising attenuating, by the one or more processors, the risk score based on at least one of an enforcement environment or regulatory resource restraints.

13. The method of claim 1, wherein the extreme event risk score is based on a probabilistic rating that reflects how likely a site is to take an abnormally long time to close relative to similar sites.

14. The method of claim 1, further comprising normalizing, by the one or more processors, the remediation score for a site to other sites.

15. The method of claim 1, further comprising weighting, by the one or more processors, at least one of the harm reduction data, the cost data or the sustainability data.

16. The method of claim 1, wherein the harm reduction data comprises an ability of a remediation option to destroy or immobilize contamination, rendering the contamination less harmful to human health or the environment.

17. The method of claim 1, wherein the cost data comprises a financial requirement to design and enact a remediation option.

18. The method of claim 1, wherein the sustainability data comprises an environmental footprint of the remedial option.

19. A system comprising:
one or more processors; and
one or more tangible, non-transitory memories configured to communicate with the one or more processors,
the one or more tangible, non-transitory memories having instructions stored thereon that, in response to execution by the one or more processors, cause the one or more processors to perform operations comprising:
developing, by the one or more processors, an extreme event risk score based on operational environment data, legislative environment data and a data environment;
determining, by the one or more processors, a remediation score based on a plurality of remediation terms including harm reduction data, cost data, sustainability data, resiliency data, the extreme event risk score and the data environment;
determining, by the one or more processors, how each remediation term of the plurality of remediation terms influences the remediation score by combining each of the plurality of remediation terms via linear combination with a weighting term,
wherein the weighting term is determined by statistical analysis of at least one of previous sites, portfolio priorities or an emphasis of a regulatory environment on each of the plurality of remediation terms;
determining, by the one or more processors, a remediated risk score for the site based on an initial risk score and the remediation score;
determining, by the one or more processors, a risk rating for the site pre-remediation based on the initial risk score and an information depth score;
determining, by the one or more processors, the risk rating for the site post-remediation based on the remediated riskscore and the information depth score;
ingesting, by the one or more processors, legislative documents from the legislative environment and into the data environment;
saving, by the one or more processors, the legislative documents as text documents in a data environment;
parsing and converting, by the one or more processors, the text documents to at least one of a directed graph or state-specific decision trees using artificial intelligence (AI) models that include deep learning models and natural language processing (NLP) routines,
wherein the directed graph is an object that describes decision nodes and edges,
wherein the edges are a directional relationship between the decision nodes, and
wherein the directed graph enforces directionality constraints on the nodes to encode at least one of causality or sequence;
detecting, by the one or more processors, knowledge to obtain detected knowledge in the form of attributes comprising key terms, rules, topic summaries, relationships between various legal terms, semantically similar terminologies, deontic expressions and cross-referenced legal facts and rules;
tagging, by the one or more processors, the detected knowledge from the text documents as a decision node or a outcome node;
building, by the one or more processors, a knowledge graph using deep learning technologies, word embeddings, text summarization, embedded provenance and topic modeling;
extracting, by the one or more processors, cross-referenced rules from the knowledge graph;
identifying and classifying, by the one or more processors, the cross-referenced rules into the deontic expressions;
re-training, by the one or more processors, a predictive model with definitions of categories of each section of the legislative documents;
implementing, by the one or more processors, content segmentation of the legislative documents to categorize each section of the legislative documents into the categories by type;
re-training, by the one or more processors, the predictive model using the risk rating and the legislative documents;
adjusting, by the one or more processors, probabilities of the extreme event risk score based on a severity of an outcome to obtain adjusted probabilities, wherein the adjusted probabilities are visually indicated by a weight of the edges in the decision tree;
adjusting the weight of the edges in the decision tree by using the machine learning models;
computing, by the one or more processors, a training objective by re-calculating probabilities underlying risk calculations of the initial risk score, by using the adjusted probabilities of the extreme event risk score and by defining portfolio priorities with the operational environment data and the legislative environment data;
updating, by the one or more processors, the predictive model to create an updated predictive model, based on the training objective; and
improving, by the one or more processors using the updated predictive model, an accuracy of the initial risk score and the risk rating to improve prediction accuracies for the other sites.

* * * * *